United States Patent
Schmidt

(10) Patent No.: US 11,889,780 B2
(45) Date of Patent: Feb. 6, 2024

(54) METHOD FOR AUTOMATING AN AGRICULTURAL WORK TASK

(71) Applicant: DEERE & COMPANY, Moline, IL (US)

(72) Inventor: Martin Schmidt, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 298 days.

(21) Appl. No.: 17/154,707

(22) Filed: Jan. 21, 2021

(65) Prior Publication Data

US 2021/0259148 A1 Aug. 26, 2021

(30) Foreign Application Priority Data

Feb. 25, 2020 (DE) .................. 102020202396.4

(51) Int. Cl.
*A01B 79/00* (2006.01)
*A01B 69/04* (2006.01)
*G05D 1/02* (2020.01)

(52) U.S. Cl.
CPC .......... *A01B 79/005* (2013.01); *A01B 69/008* (2013.01); *G05D 1/0219* (2013.01); *G05D 1/0227* (2013.01); *G05D 2201/0201* (2013.01)

(58) Field of Classification Search
CPC .................................................. A01B 79/005
See application file for complete search history.

(56) References Cited

U.S. PATENT DOCUMENTS 8,862,339 B2   10/2014   Henry et al.
9,026,321 B2   5/2015    Henry et al.
(Continued)

FOREIGN PATENT DOCUMENTS

EP   2668469 B1   4/2017
EP   3189719 A1   7/2017
(Continued)

OTHER PUBLICATIONS

A. Stentz, C. Dima, C. Wellington, H. Herman, and D. Stager, "A System for Semi-Autonomous Tractor Operations," Kluwer Academic Publishers, Robotics Institute, Carnegie Mellon University, Pittsburgh, PA 15213, USA, 2002.
(Continued)

*Primary Examiner* — Shelley Chen
(74) *Attorney, Agent, or Firm* — Taft Stettinius & Hollister LLP; Stephen F. Rost

(57) ABSTRACT

A method for automating an agricultural work task includes specifying one or more site-specific target values or weighting factors with respect to process-related or agronomic quality criteria via an interface module according to which the work task is to be executed by the soil cultivation implement. The method includes converting the target values or weighting factors in an optimization module into process control variables representing working or operating parameters of the soil cultivation implement, and adjusting the process control variables in a stabilization module by activating positioning or operating units of the soil cultivation implement or the agricultural tractor. In the converting step, feedback data is included with respect to a status of a field surface before or after the cultivation by the implement and with respect to an operating status of the implement or the tractor in order to modify the process control variables.

14 Claims, 3 Drawing Sheets

(56) References Cited

U.S. PATENT DOCUMENTS

| | | | |
|---|---|---|---|
| 9,282,688 | B2 | 3/2016 | Casper et al. |
| 9,405,039 | B2* | 8/2016 | Anderson ............... A01B 71/08 |
| 10,010,021 | B2 | 7/2018 | Foster et al. |
| 10,462,957 | B2* | 11/2019 | Clement ............. B60W 50/082 |
| 2015/0296701 | A1* | 10/2015 | Anderson ............ G01V 11/002 |
| | | | 172/430 |
| 2016/0029547 | A1 | 2/2016 | Casper et al. |
| 2017/0112043 | A1 | 4/2017 | Nair et al. |
| 2017/0325394 | A1* | 11/2017 | Clement ................ A01B 71/02 |
| 2018/0220577 | A1 | 8/2018 | Posselius et al. |

FOREIGN PATENT DOCUMENTS

| | | | | |
|---|---|---|---|---|
| EP | 2936957 | B1 | 8/2017 | |
| EP | 3243368 | A2 * | 11/2017 | ........... A01B 59/042 |
| EP | 3243368 | A2 | 11/2017 | |
| EP | 3243368 | B1 * | 11/2019 | ........... A01B 59/042 |

OTHER PUBLICATIONS

C. Foster, J. Posselius and B. Lukac, "Autonomous Agricultural Machines—The Next Evolution in Farming," in Land.Technik AgEng 2017, Hannover, VDI-MEG, 2017.

N. Tarasinski, V. Kegel and J. Daubemann, "GridCON—Development and Testing of a Cable-fed, Full Electric and Autonomous Agricultural Machine," in Conference Agricultural Engineering: Land.Technik 2018, VDI-Verlag GmbH Düsseldorf, 2018.

Agco, "Mars: Robot system for planting and accurate documentation," 2019.

A. Albert, "Autonome Systeme in Haus und Hof / auf Feld und Straße," VDI-Arbeitskreis LANDTECHNIK in Köln, Köln, 2014.

N. Streitberger, F. Balbach and E. Nacke, "From manually driving to full autonomy: An approach to systematically define levels of automation in agricultural engineering," in Conference Agricultural Engineering: Land.Technik 2018, VDI-Verlag GmbH Düsseldorf, 2018.

S. Becker and M. Geimer, "Neuartige Sensorik für die automatisierte Landtechnik," in Conference Agricultural Engineering: Land. Technik 2018, VDI-Verlag GmbH Düsseldorf, 2018.

John Deere, "John Deere Precision Ag Technology," 2019.

P. Riegler-Nurscher, J. Karner, J. Huber, G. Moitzi, H. Wagentristl, M. Hofinger and H. Prankl, "A system for online control of a rotary harrow using soil," in Conference Agricultural Engineering: Land. Technik 2017, VDI-Verlag GmbH Düsseldorf, 2017.

D. Bottoms, "The tractor driver's steering control task, "Ergonomics Department, National Institute of Agricultural Engineering, Wrest Park, Silsoe, Bedford, Bedfordshire MK45 4HS, England, 1982.

K. T. Renius, Fundamentals of Tractor Design, Baldham: Springer, 2019.

E. Donges, "Aspekte der Aktiven Sicherheit bei der Führung von Personenkraftwagen," in Automobil-Industrie 27, 1982, pp. 183-190.

J. Rasmussen, "Skills, Rules, and Knowledge; Signals, Signs, and Symbols, and Other Distinctions in Human Performance Models," IEEE Transactions on Systems, Man, and Cybernetics, No. vol. SMC-13, No. 3, May/Jun. 1983, 1983.

E. Donges and K. Naab, "Regelsysteme zur Fahrzeugführung und-Stabilisierung in der Automobiltechnik," Automatisierungstechnik, vol. 44, No. 5/96, pp. 226-236, 1996.

E. Donges, "Fahrerverhaltensmodelle," in Handbuch Fahrerassistenzsysteme, Darmstadt, Springer Vieweg, 2015.

R. Herbst, "Erhebung von Boden-und Bestandesunterschieden in Online—Offline Verfahren," in Precision Farming—Analyse, Planung Umsetzung in die Praxis KTBL-Schrift 419, Münster, Landwirtschaftsverlag, 2004.

T. Oksanen, R. Soitinaho, J. Huuskonen and V. Väyrynen, "Autonomous Tractors harrowing and sowing simultaneously," in 77th International Conference on Agricultural Engineering Land.Technik AgEng 2019, Düsseldorf, 2019.

J. Horstmann, "Moderne Kommunikationssysteme in der Landtechnik," in Jahrbuch Agrartechnik, Braunschweig, 2013.

Ortsspezifische Bodenbearbeitung und Einsparpotenzial—Die wichtigen Schritte. Voßhenrich, Hans-Heinrich. [Hrsg.] Franz-Josef Bockisch Rudolf Artmann. Braunschweig: s.n., 2003.

Geoprospectors. Geoprospectors. [Online] [Zitat vom: Jan. 7, 2020.] http://www.geoprospectors.com/.

Steinhaus, Sebastian, Trösken, Lennart und Frerichs, Prof. Dr. Ludger. Methodik zur Erfassung und Bewertung qualitätsbestimmender Parameter bei der Stoppelbearbeitung. [Buchverf.] VDI-MEG. 2018.

Becker, Simon, et al. Machine Learning for Process Automation of Agricultural Machines in Field Applications. [Buchverf.] VDI-MEG. [Hrsg.] VDI Wissensforum GmbH. 77th International Conference on Agricultural Engineering Land.Technik AgEng 2019. Düsseldorf: s.n., 2019, Bde. VDI-Berichte 2361.

Hensel, Oliver, Hartung, Eberhard und Reckleben, Yves. DBU Projekt Az 24295-34/0 Förderung der Mulchsaat durch Entwicklung und Erprobung einer Sensor-und Verfahrenskombination zur Präzisionsbodenbearbeitung—Abschlussbericht. 2010.

Hui, Jonathan. Lane keeping in autonomous driving with Model Predictive Control & PID. [Online] 2020. https://medium.com/@jonathan_hui/lane-keeping-in-autonomous-driving-with-model-predictive-control-50f06e989bc9.

Kohut, Nicholas J., Hedrick, J. Karl und Borrelli, Francesco. Integrating Traffic Data and Model Predictive Control to Improve Fuel Economy. Proceedings of the 12th IFAC Symposium on Transportation Systems. Redondo Beach, CA, USA : s.n., 2009.

Landesbetrieb Landwirtschaft Hessen. [Online] Jan. 14, 2020. https://llh.hessen.de/unternehmen/unternehmensfuehrung/analyse-strategie-und-finanzen/hinweise-zu-getreidestroh-und-naehrstoffwert/.

Schmidt, Martin, "Description of the operator's tasks with a tractor-implement combination as a basis for further automation developments in agricultural engineering," LanderTechnik Agricultural Engineering, vol. 75 No. 3, published Sep. 16, 2020.

Extended European Search Report and Written Opinion issued in European Patent Application No. 21152518.3, dated Jul. 13, 2021, in 10 pages.

N. Tarasinski, V. Kegel and J. Daubemann, "GridCON—Development and Testing of a Cable-fed, Full Electric and Autonomous Agricultural Machine," in *Conference Agricultural Engineering: Land.Technik 2018*, VDI-Verlag GmbH Düsseldorf, 2018, 6 pages.

N. Streitberger, F. Balbach and E. Nacke, "From manually driving to full autonomy: An approach to systematically define levels of automation in agricultural engineering," in *Conference Agricultural Engineering: Land.Technik 2018*, VDI-Verlag GmbH Düsseldorf, 2018, 22 pages.

S. Becker and M. Geimer, "Neuartige Sensorik für die automatisierte Landtechnik," in *Conference Agricultural Engineering: Land. Technik 2018*, VDI-Verlag GmbH Düsseldorf, 2018, 16 pages.

K. T. Renius, Fundamentals of Tractor Design, Baldham: Springer, 2019, pp. 1-138.

K. T. Renius, Fundamentals of Tractor Design, Baldham: Springer, 2019, pp. 139-287.

E. Donges, "Aspekte der Aktiven Sicherheit bei der Führung von Personenkraftwagen," in *Automobil-Industrie 27*, 1982, 20 pages.

E. Donges and K. Naab, "Regelsysteme zur Fahrzeugführung und-Stabilisierung in der Automobiltechnik," *Automatisierungstechnik*, vol. 44, No. 5/96, 1996, 25 pages.

E. Donges, "Fahrerverhaltensmodelle," in *Handbuch Fahrerassistenzsysteme*, Darmstadt, Springer Vieweg, 2015, 20 pages.

R. Herbst, "Erhebung von Boden-und Bestandesunterschieden in Online—Offline Verfahren," in *Precision Farming—Analyse, Planung Umsetzung in die Praxis KTBL-Schrift 419*, Münster, Landwirtschaftsverlag, 2004, 18 pages.

J. Horstmann, "Moderne Kommunikationssysteme in der Landtechnik," in *Jahrbuch Agrartechnik*, Braunschweig, 2013, 16 pages.

*Ortsspezifische Bodenbearbeitung und Einsparpotenzial—Die wichtigen Schritte.* Voßhenrich, Hans-Heinrich. [Hrsg.] Franz-Josef Bockisch Rudolf Artmann. Braunschweig : s.n., 2003, 22 pages.

(56) References Cited

OTHER PUBLICATIONS

Steinhaus, L. Trösken and L. Frerichs, "Methodik zur Erfassung und Bewertung qualitätsbestimmender Parameter bei der Stoppelbearbeitung," 2018, 17 pages.

Hensel, Oliver, Hartung, Eberhard und Reckleben, Yves. *DBU Projekt Az 24295-34/0 Förderung der Mulchsaat durch Entwicklung und Erprobung einer Sensor-und Verfahrenskombination zur Präzisionsbodenbearbeitung—Abschlussbericht.* 2010, 88 pages.

M. Reinhards, G. Kormann and U. Scheff, "Fahrerassistenzsysteme bei Traktoren," in *Handbuch Fahrerassistenzsysteme,* Darmstadt, Springer Vieweg, 2015, 34 pages.

\* cited by examiner

METHOD FOR AUTOMATING AN AGRICULTURAL WORK TASK

RELATED APPLICATIONS

This application claims priority to German Application No. 102020202396.4, filed Feb. 25, 2020, the disclosure of which is hereby expressly incorporated by reference in its entirety.

FIELD OF THE DISCLOSURE

The present disclosure relates to a method for automating an agricultural work task, which is executed by a soil cultivation implement on an agricultural tractor.

BACKGROUND

A method of adaptive and site-specific soil cultivation is increasingly gaining importance in the course of the introduction of precision agriculture. Driving factors are cultivation efficiency and cultivation quality, wherein the cultivation efficiency ultimately results from the process costs, i.e., fuel consumption, machine lifetime, labor costs, and possible rental costs, and also achievable agricultural utility. These factors are in tension here, which is to be taken into consideration during the work planning. The work planning is typically performed on the basis of application maps, which are based on yield assessments, experiential values, or data of preceding drone or satellite overflights. If the soil cultivation is performed in particular by a soil cultivation implement for basic soil or seedbed cultivation, i.e., a cultivator, a rotary harrow, a disk harrow, or a plow, starting from the prepared application maps, a site-specific cultivation speed or working depth to be maintained in each case during the field cultivation is derived. This is set by corresponding interventions in an engine controller of an agricultural tractor or by suitable change of the lift position of a three-point power lift on the agricultural tractor, to which the soil cultivation implement is attached. In case of a rotary harrow, a control of the speed of driven rotors is possibly also included. More extensive optimization of the cultivation process incorporating situational or local influences which are difficult to assess usually does not take place here. These include weather-related influences, the distribution and mass density of remaining harvest residues, subsequent planned cultivation steps, and the like. However, the latter have significant influence on the cultivation quality.

Thus, there is a need to specify a method of the type mentioned at the outset, improved with respect to achievable cultivation efficiency and cultivation quality.

SUMMARY

According to the present disclosure, a method for automating an agricultural work task which is executed by a soil cultivation implement on an agricultural tractor provides that, by way of a control unit (i) in a first method step, one or more site-specific target values or weighting factors with respect to process-related or agronomic quality criteria are specified via an interface module, according to which the work task is to be executed by the soil cultivation implement, (ii) in a second method step, the target values or weighting factors are converted in an optimization module into process control variables representing working or operating parameters of the soil cultivation implement, and (iii) in a third method step, the process control variables are adjusted in a stabilization module by activating positioning or operating units of the soil cultivation implement or the agricultural tractor, wherein in the second method step, feedback data with respect to a status of a field surface before or after the cultivation by the soil cultivation implement and with respect to an operating status of the soil cultivation implement or the agricultural tractor are incorporated in order to modify the process control variables.

The method, which is based on a cascaded control loop, is designed iteratively in this case due to the feedback data returned to the optimization module and thus to be self-optimizing with respect to the achievable cultivation efficiency and quality. The individual modules can be functionally stored here in the control unit as corresponding software.

A use of the method according to the present disclosure is advisable in particular in conjunction with soil cultivation implements for basic soil or seedbed cultivation, such as a cultivator, a rotary harrow, a disk harrow, or a plow. They are used to prepare the field surface for a subsequent planting or sowing process.

The site-specific target values or weighting factors are specified in the context of work preparation or planning and uploaded to a storage unit or a data cloud associated with the control unit, so that they are retrievable from there when the interface module runs through the control loop. Carrying out the work preparation or planning is typically performed on the part of an operator via a user interface provided in the agricultural tractor or via a central farm management system, which in particular has access to an agronomic database, which contains, inter alia, items of information with regard to course, height profile, and dimensions of the field surface to be cultivated, soil properties, prior management history, future management planning including subsequently planned cultivation steps, technical specifications of the soil cultivation implement used, and up-to-date specifications of external influencing factors such as the (prior, current, or predicted to be expected) weather conditions and the like.

The possibility exists in this case that the process-related or agronomic quality criteria in particular relate to an area performance, process costs, or an agronomic work quality producible by the soil cultivation implement. The process costs ideally cover the total occurring financial commitment with regard to carrying out the work task, in particular fuel costs and running operating costs including the investment costs resulting from the service life of the machines used, labor costs, and possible rental costs in each case per unit of area to be cultivated.

The site-specific target values or weighting factors initially specified in the course of the work preparation or planning via the interface module are based in this case on heuristic assumptions with respect to the actual process costs. The heuristic assumptions originate here from the minimum process costs predicted to be expected, while in contrast the target values of the agronomic work quality or the quality criteria representing it are assessed as realistically as possible. The former solely form a starting point for the iterative self-optimization process subsequently executed.

On the level of the optimization module, the site-specific target values or weightings originating from the interface module are modified in accordance with the feedback data. The judgment of the status of the field surface represented by these data before or after the cultivation by the soil cultivation implement can take place here using imaging sensor mechanism, which optically acquire the field surface in front of the agricultural tractor (forward-looking sensor mechanism) or behind the soil cultivation implement (rear-looking sensor mechanism). The imaging sensor mechanisms are, for example, one or more mono or stereo cameras, which operate in the visible or IR wavelength range. A combination with further sensor mechanism, such as ground penetrating radar or LiDAR is conceivable for improving the data quality.

The forward-looking sensor mechanism are attached in the front roof region of a driver cab of the agricultural tractor, so that they are subjected to the least possible extent to the dust development caused during the soil cultivation. However, an attachment in the front region of an engine hood or on a front weight is also conceivable. The rear-looking sensor mechanism, in contrast, are associated with the soil cultivation implement and are fastened on the rear there on a supporting implement structure. Furthermore, an attachment in the rear roof region of the driver cab is also possible.

To obtain a better concept of the nature of the feedback data, they will be illustrated hereinafter on the basis of the example of a harvested grain field or corn field.

The feedback data provided by the forward-looking sensor mechanism for the case of a harvested grain field can thus relate to status parameters such as the stubble density (i.e., the number of the grain stubbles per unit of area), the height or length of the stubbles or the straw residues, distribution or mass density of an overlaid straw mat, weed infestation, the degree of a soil compaction, and the course of the stubble rows with respect to the cultivation direction. If it is a corn field harvested (by a forage harvester), in particular the status of the stubbles is also significant, namely for the case that they have been split open or flattened by driving over by the forage harvester during the harvesting process to combat the corn root worm. The parameters listed above are solely to give an overview of the feedback data used for modification of the process control variables; a variety of further or other status parameters is also additionally conceivable. The analysis or image processing of the raw data supplied by the sensor mechanism can be carried out in this case using an image processing system conditioned by a deep learning approach.

This can accordingly also apply to the feedback data obtained by the rear-looking sensor mechanism. For the case of a harvested grain field, these data can relate to status parameters such as the degree of incorporation of the grain residues or the remaining degree of straw coverage, the crumbling of the field surface, the degree of subsoil loosening, or the degree of incorporation of weeds. In the case of a harvested corn field, in addition to the degree of incorporation of the corn stubble or the plant residues in general, status parameters such as the degree of pulverization of the corn stubbles can be included.

Furthermore, a modification of the process control variables as a function of an operating status of the soil cultivation implement or the agricultural tractor is provided. This is derived, for example, from items of information of a current fuel consumption of the agricultural tractor, a current cultivation speed resulting from its travel speed, or a sensorially acquired working depth (soil engagement depth) of the soil cultivation implement. The relevant items of information are typically available on a CAN bus or ISOBUS of the agricultural tractor.

Items of information with respect to a current functional status of the soil cultivation implement can also be incorporated into the feedback data. The current functional status can be monitored by using camera-based detector mechanism on the soil cultivation implement or its supporting implement structure, wherein these mechanisms recognize on the basis of corresponding image processing or analysis whether harvest residues have collected in the tools of the soil cultivation implement (for example the tines of a cultivator) and can result in possible disturbances of the cultivation process. Furthermore, a consideration of the current material flow, i.e., the throughput of harvest residues and field soil per unit of time, is possible in the evaluation of the current functional status.

For the purpose of (self-)optimization of the achievable cultivation efficiency and quality, it can be provided in particular that a cost function is calculated and minimized within predetermined limits of the agronomic quality criteria by the control unit for the modification of the process control variables.

The cost function can be a relationship of the form $$J_{total} = \lambda_1 \cdot J_{Fuel} + \lambda_2 \cdot J_{Operation} + \sum_{k=0}^{M} l(\epsilon_k(t_q), t_q)_{Work\ quality}$$

wherein the dimension $J_{Fuel}$ reflects the fuel costs and the dimension $J_{Operation}$ reflects the running operating costs. The two dimensions $J_{Fuel}$ and $J_{Operation}$ initially result here from the site-specific target values specified via the interface module with respect to the process costs, wherein they are adapted accordingly in the context of the performed self-optimization. The component $$\sum_{k=0}^{M} l(\epsilon_k(t_q), t_q)_{Work\ quality}$$

corresponds here to an unequal secondary condition for maintaining the site-specific target values for the agronomic work quality or the quality criteria representing it. $\epsilon_k$ represents in this case a status parameter obtained by the forward-looking or rear-looking sensor mechanism and $l(\epsilon_k(t_q),t_q)$ represents a penalty term, which models the costs upon infringement of a respective agronomic secondary condition $\epsilon_{k,min} \leq \epsilon_k \leq \epsilon_{k,max}$ to be maintained. The summation takes place here over its total number M, corresponding to the scope of the feedback data.

In other words, the agronomic quality criteria are incorporated as secondary conditions in the cost function by the control unit.

The coefficient $\lambda_1$ or $\lambda_2$ forms a weighting factor to be selected for the fuel costs or operating costs, the value of which is empirically specified and can be varied by the operator within given limits. This applies, inter alia, to the case in which the operator places increased value on a cost-saving or fuel-saving performance of the cultivation process.

The basic concept for the agronomic work quality to be achieved, therefore the quality criteria representing it, is that the operator selects the latter in the context of the work preparation or planning and additionally can assess them by an associated weighting factor $q_k$. The resulting process costs then result as $$l(\epsilon_k(t_q), t_q) = \sum_{q=0}^{N} \sum_{j=0}^{1} q_k \left[ (K_{j1} + K_{j2} \cdot \epsilon_k(t_q) + K_{j3} \cdot \epsilon_k(t_q)^2 \right],$$

wherein the term associated with the index j=0 forms a lower limit and the term associated with the index j=1 forms an upper limit for a corridor to be maintained with respect to the kth status parameter $\in_k$. Such a corridor can be formed, for example, on the basis of a permissible degree of straw coverage between 0% and 30% or between 30% and 60%. The corridor to be maintained for the status parameter $\in_k$ then results in a U-shaped curve or increase of the process costs toward the limits of the corridor. The parameters $K_{j1}$, $K_{j2}$, $K_{j3}$ are empirically determined values which represent a deviation of the process costs upon infringement of the predetermined target values for the agronomic work quality. These influence the strictness of the rise of the process costs upon reaching the corridor limits. $t_q$ represents the time which has passed at the discrete point in time q.

The sum $$\sum_{q=0}^{N}$$

corresponds to the total amount of the process costs for an optimization horizon N, which is typically between a few milliseconds up to 5 seconds. If the time counter $t_q$ is assigned, for example, a time span of 1 second, N=5 would thus apply for an optimization horizon of 5 seconds.

To illustrate the cost function, reference is again to be made in the following to the example of the degree of straw coverage $\in_{residue} \in [0,1]$ behind the soil cultivation implement, $$\in_{residue,min} \leq \in(t_q)_{residue} \leq \in_{residue,max}.$$

$\in_{residue} \in [0,1]$ indicates that the degree of straw coverage is in an interval between 0% and 100%.

The process cost expenditure $l(\in_{residue}(t_q), t_q)$ upon infringement of the secondary condition for $\in_{residue}$ then results as $$l(\in_{residue}(t_q), t_q) =$$
$$\sum_{q=0}^{N} \sum_{j=0}^{1} q_k \left[ (K_{j1} + K_{j2} \cdot \epsilon_k(t_q) + K_{j3} \cdot \epsilon_k(t_q)^2) \right] = \sum_{q=0}^{N} q_{residue}$$
$$\left[ (K_{low,1} + K_{low,2} \cdot \epsilon_{residue}(t_q) + K_{low,3} \cdot \epsilon_{residue}(t_q)^2) + \right.$$
$$\left. (K_{high,1} - K_{high,2} \cdot \epsilon_{residue}(t_q) - K_{high,3} \cdot \epsilon_{residue}(t_q)^2) \right],$$

where secondary condition is only active in the range of $\in_{residue}(t_q) \in [0, \in_{residue,c}]$ or $\in_{residue}(t_q) \in [\in'_{residue,c}, 1]$. Out of the described range, costs out of the secondary condition are equal zero. Further $$K_{low,1} + K_{low,2} \cdot \in_{residue}(t_q) + K_{low,3} \cdot \in_{residue}(t_q)^2 \geq$$
$$0 \forall \in_{residue}(t_q) \in [0, \in_{residue,c}],$$

$$K_{high,1} - K_{high,2} \cdot \in_{residue}(t_q) - K_{high,3} \cdot \in_{residue}(t_q) \geq 0 \forall \in_{residue}(t_q) \in [\in'_{residue,c}, \geq 1],$$

wherein $\in_{residue,c}$ or $\in'_{residue,c}$ is in each case a fixed value which is specified by the operator. Depending on the situation and preference of the operator, this corresponds to a degree of straw coverage of 0% or 30%, respectively, or 30% or 60%, respectively.

For the fuel costs $J_{Fuel}(t_q)$, the following applies $$J_{Fuel}(t_q) = \sum_{q=0}^{N} \left| \dot{f}_{target,tq} - \dot{f}_{actual,tq} \right|^2,$$

wherein the deviation of the actual value $\dot{f}_{actual,t_q}$ from a target value $\dot{f}_{target,t_q}$ of the chronological change of the fuel quantity f specified in the context of the work preparation or planning is calculated and subsequently documented by the control unit to add it to the total fuel costs for the field surface to be cultivated. A relationship of the following form applies here $$f = f(\dot{x}(t_q), M_w(t_q), \ddot{x}(t_q), d(t_q), b, t_q),$$

because the total fuel quantity f consumed at the time $t_q$ or the time derivative $\dot{f}$ thereof may generally be described as a function of a working depth $d(t_q)$, a cultivation speed $\dot{x}(t_q)$, a working width b, a resistance torque $M_w(t_q)$ opposing the travel or the soil cultivation, and a driving acceleration $(t_q)$ of the agricultural tractor.

Correspondingly, the following applies for the running operating costs $J_{Operation}(t_q)$ $$J_{Operation}(t_q) = \sum_{q=0}^{N} |\dot{x}_{target} - \dot{x}_{actual}|^2,$$

wherein here the deviation of the actual value $\dot{x}_{actual}$ from a target value $\dot{x}_{target}$ of the cultivation speed $\dot{x}(t_q)$ specified in the context of the work preparation or planning, in other words the area performance equivalent thereto, is calculated and subsequently documented by the control unit to add it to the total operating costs for the field surface 18 to be cultivated.

The process control variables derived by the optimization module on the basis of the cost function are in the context of a soil cultivation implement designed as a cultivator working or operating parameters in the form of the working depth $d(t_q)$ and the cultivation speed $\dot{x}(t_q)$. These are adjusted in the stabilization module by a P, PI, or PID controller or a Riccati status controller by activating the positioning or operating units of the soil cultivation implement or the agricultural tractor: The cultivation speed $\dot{x}(t_q)$ is adapted in this case by corresponding interventions in an engine controller of the agricultural tractor, while in contrast the working depth $d(t_q)$ is set by suitably changing the lift position of a rear three-point power lift, on which the soil cultivation implement is attached to the agricultural tractor.

The material flow corresponding thereto results here from the product of working width b, working depth $d(t_q)$, and cultivation speed $\dot{x}(t_q)$ as $$\dot{m}(t_q) = d(t_q) \cdot b \cdot \dot{x}(t_q)).$$

To derive the process control variables, a model-predictive approach is selected, which is based on the abovementioned minimization of the cost function within the optimization horizon $t_q = 0, \ldots, N$. The model-predictive approach supplies a manipulated variable trajectory of the process control variables which is cost optimized with respect to the optimization horizon, wherein it is updated for each following discrete time. The manipulated variable trajectory associated with the current time q then forms the foundation for the activation of the positioning or operating units of the soil cultivation implement or the agricultural tractor in the subsequent stabilization module. Alternatively, a static optimization method can also be used instead of model predictive approach.

Of course, working or operating parameters such as the working depth $d(t_q)$ and the cultivation speed $\dot{x}(t_q)$ have restrictions. In addition, additional restrictions can be intentionally specified by the operator. As a result, this leads to corresponding manipulated variable restrictions when adjusting the process control variables.

If a manipulated variable restriction results in particular due to limiting of the working depth $d(t_q)$ specified by the operator, $$d_{min} \leq d(t_q) \leq d_{max},$$

this can thus additionally be taken into consideration in the cost function in the form of a further secondary condition, wherein the secondary condition may be represented, similarly to the formulation of the associated penalty term $l(\in_k(t_q), t_q)$, in the form $l(d(t_q))$. Alternatively, a further cost component $J_{delta\ d(t_q)}$ can also be added in the cost function, $$J_{delta\ d(t_q)} = \sum_{q=0}^{N} |d_{target} - d(t_q)|^2,$$

wherein $d_{target}$ represents a target value specified for the working depth in the context of the work preparation or planning.

For the case in which an adjustment of the process control variables is not possible due to manipulated variable restrictions, it is conceivable to functionally expand the control range of the control unit by switching on an additional soil cultivation implement, such as an active soil cultivation implement.

The combination of a soil cultivation implement in the form of a cultivator with a mulcher attached in the front region of the agricultural tractor is mentioned here by way of example in this context. The latter may be adjusted in its working height $d_{Mulcher}$ in this case by a frontal three-point power lift.

During the operation of the cultivator, a manipulated variable restriction predominantly results due to its limited usable working depth $d(t_q)$. If a manipulated variable saturation thus occurs, an artificial expansion of the manipulated variable range can be achieved by a split-range control. If the cultivator reaches its maximum possible working depth $d(t_q) = d_{max}$, the mulcher is thus switched on, wherein its working depth $d_{Mulcher}$ is adjusted by activating the frontal three-point force lift in such a way that the effect of the manipulated variable restriction caused by the cultivator is compensated for.

In addition, there is the possibility that the soil cultivation implement is monitored by the control unit with respect to an interruption of a material flow ṁ resulting from the adjustment of the process control variables. In the normal case, the desired material flow ṁ is ensured by corresponding adjustment of the process control variables. However, there are also situations in which the soil cultivation implement clogs, in case of a cultivator, for example due to excess straw accumulations in the tines. Such clogs may be predicted by monitoring of the material flow ṁ by camera-based detector mechanism.

An imminent or already occurring interruption of the material flow ṁ thus recognized can be counteracted on the part of the control unit by activating positioning or operating units of the soil cultivation implement or the agricultural tractor: The simplest procedure is to intentionally raise and extend the soil cultivation implement by activating the rear three-point force lift until the clog detaches by itself. This can be performed predictively as soon as the control unit recognizes on the basis of the items of information provided by the camera-based detector mechanism that a threshold value to be maintained for clog-free operation is exceeded. In addition, a mulcher attached in the front region of the agricultural tractor can be included to improve the material flow on the cultivator by pulverizing the grain residues.

The monitoring of the material flow ṁ can be included as a subordinate control loop in the stabilization module provided for adjusting the process control variables. The material flow ṁ ($\dot{m} = b \cdot d(t_q) \cdot \dot{x}(t_q)$) thus sinks due to resistance with growing material accumulation $m_{stat}$ in the soil cultivation implement. The process control variable to be changed is in the case of a cultivator also the working depth $d(t_q)$ here. The control unit reduces the process control variable $d(t_q)$ with increasing extent of the material accumulation to counteract clogging. At the same time, it attempts to maintain the desired material flow by increasing the working depth $d(t_q)$. Corresponding specification variables $d_{\dot{m}}$ and $d_{mstat}$ result therefrom for the control of the material flow ṁ. The present control processes resulting therefrom are harmonized by the control unit in that the lesser of the two specification variables $\min[d_{\dot{m}}, d_{mstat}]$ is always used for adjusting the process control variable $d(t_q)$.

So as not to further negatively affect the cultivation process, it is furthermore possible that the travel of the agricultural tractor is stopped by the control unit until the clog-related interruption is remedied. For this purpose, the agricultural tractor can be brought to a standstill ($\dot{x}(t_q) = 0$) from a specific threshold value for $m_{stat}$.

A site-specific statement of costs can moreover be calculated by the control unit on the basis of the calculated cost function and visualized via the user interface or its display unit. More specifically, the actually occurring fuel costs and the achieved area performance including possible deviations from the assumptions made in the work preparation or planning can be displayed to the user upon completion of the cultivation process. The display of the deviations can be performed in a site-specific manner for the purpose of improved process analysis.

In addition, a cost range, in which the process costs are predicted to be, can be displayed to the operator before beginning the actual cultivation process. This cost range is based on the heuristic assumptions with respect to the specification of the site-specific target values or weighting factors in the interface module and additional empirical factors which relate to an estimation of the highest process costs.

The cultivation results provided in this way can also be transmitted by the control unit to a central farm management system to enable comprehensible documentation of the field status at any time.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
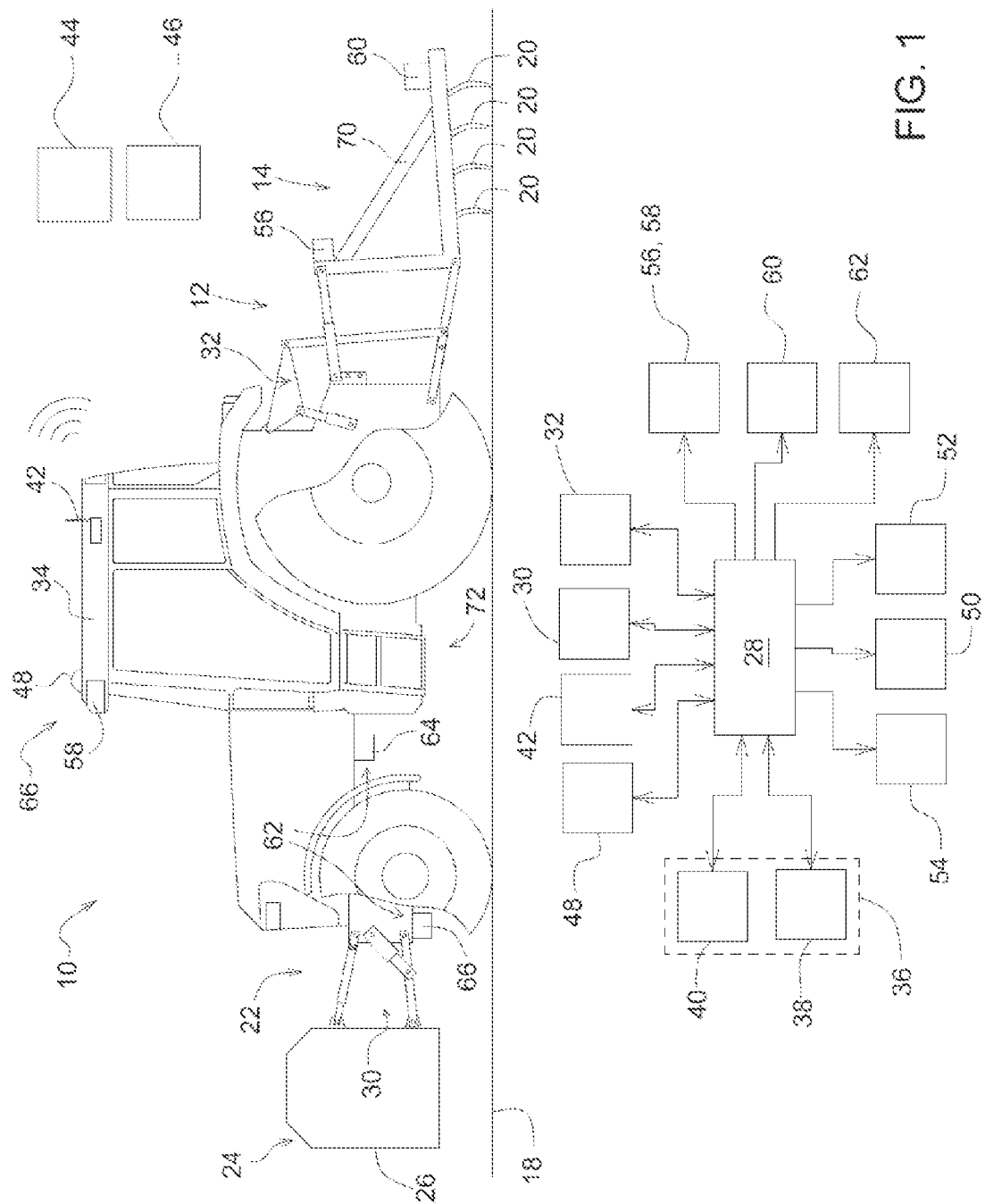
FIG. 1 shows an exemplary embodiment of a device for carrying out the method according to the present disclosure for automating an agricultural work task.

FIG. 1 shows a device comprised by an agricultural vehicle for carrying out the method according to the present disclosure for automating an agricultural work task.

The agricultural vehicle is, by way of example, an agricultural tractor 10 having a rear three-point power lift 12, on which a soil cultivation implement 14 for basic soil or seedbed cultivation is attached, in the form of a cultivator 16 here having a plurality of tines 20 engaging in soil or a field surface 18. The cultivator 16 is used, on the one hand, for loosening and crumbling the soil and, on the other hand, for incorporating overlaid humus material on the field surface 18. The humus material is typically formed by plant residues of a harvested grain field or corn field. For the case of the grain field shown in FIG. 1, it is accordingly straw overlaid on the field surface 18. Alternatively, however, the cultivator 16 can also be used for cultivating a corn field which has been harvested (by a forage harvester).

Furthermore, a frontal three-point force lift 22 is provided, on which an additional soil cultivation implement 24 in the form of a mulcher 26 is attached, by which the plant residues lying distributed on the field surface 18 may be pre-pulverized if needed to ensure an improved throughput (material flow) at the cultivator 16.

Both three-point force lifts 12, 22 may be changed in their lift position on the part of a control unit 28 by activating a respective associated hydraulic lift mechanism 30, 32.

The control unit 28, which is ultimately an onboard computer, is furthermore connected to a user interface 36 housed in a driver cab 34 of the agricultural tractor 10, which comprises an operating panel 38 and a display unit 40, a data interface 42 for establishing a wireless data exchange connection with a central farm management system 44 or a data cloud 46, a GPS receiver 48 for position determination, an engine controller 50, a memory unit 52, a CAN bus or ISOBUS 54, and camera-based detector mechanism 56.

In addition, the control unit 28 receives items of information of imaging sensor mechanism 58, 60 which optically acquire the field surface 18 in front of the agricultural tractor 10 (forward-looking sensor mechanism 58) or behind the soil cultivation implement 14 (rear-looking sensor mechanism 60). The imaging sensor mechanism 58, 60 include one or more mono or stereo cameras which operate in the visible or IR wavelength range. To improve the data quality, a combination with further sensor mechanism 62 is provided, in the present case a ground penetrating radar 64 or LiDAR 66.

The forward-looking sensor mechanism 58 is attached in the roof region 68 of the driver cab 34 of the agricultural tractor 10, so that they are subjected to the least possible extent to a dust development caused during the soil cultivation. In contrast, the rear-looking sensor mechanism 60 is associated with the soil cultivation implement 14 and are fastened there on the rear on a supporting implement structure 70. Ground penetrating radar 64 or LiDAR 66 are located in the region of an underside 72 of the agricultural tractor 10 and are oriented on the field surface 18 located underneath.

Figure 2:
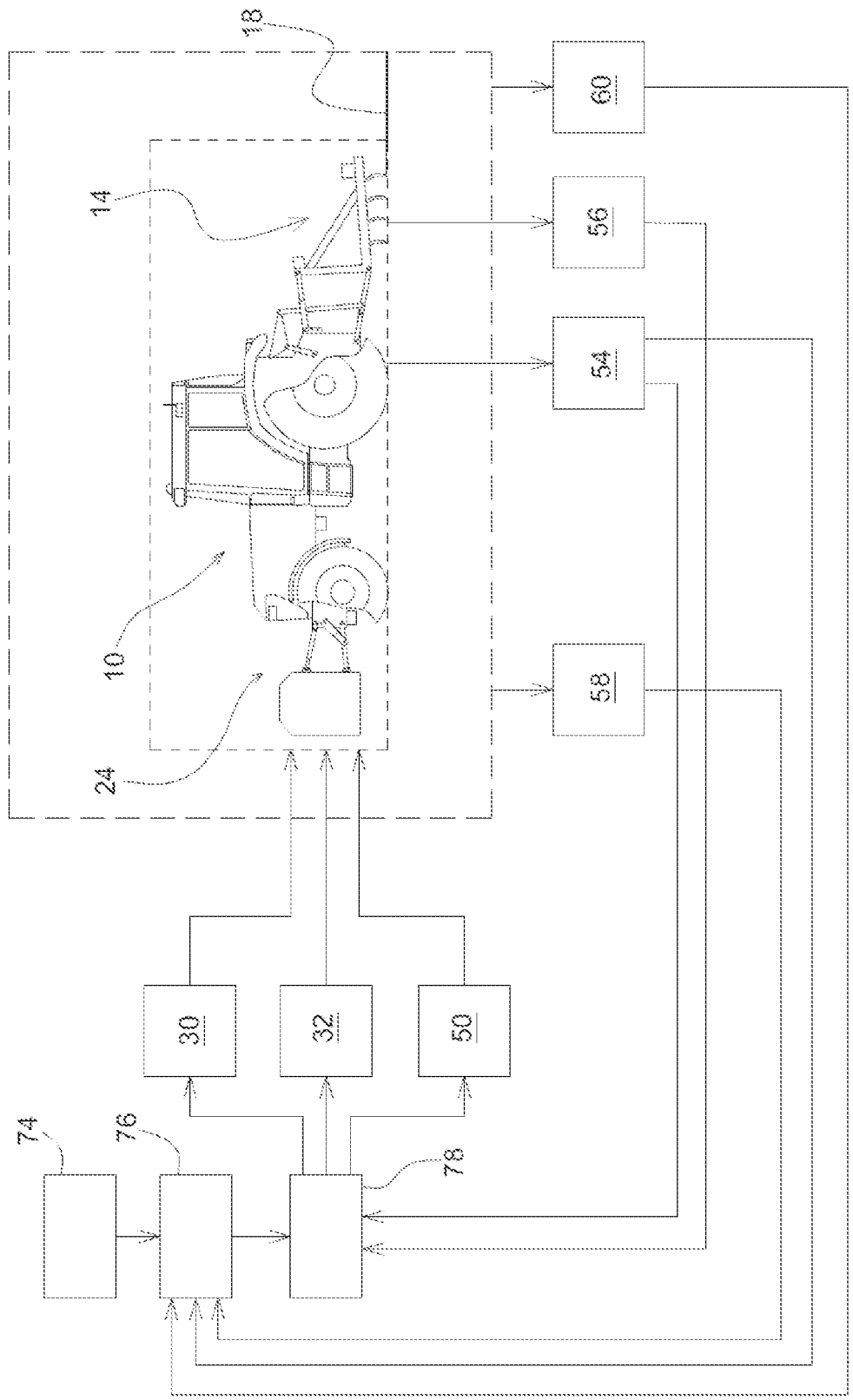
FIG. 2 shows an exemplary embodiment of the method according to the present disclosure, illustrated as a flow chart, for automating an agricultural work task.

FIG. 2 shows an embodiment of the method according to the present disclosure, illustrated as a flow chart, for automating an agricultural work task. The method may be roughly divided into three modules, which form a cascaded control loop and are functionally stored in the control unit 28 as corresponding software. Specifically, these are an interface module 74, an optimization module 76, and a stabilization module 78. Their function is described in detail hereinafter.

Interface Module

In a first method step, one or more site-specific target values or weighting factors with respect to process-related or agronomic quality criteria are specified by the control unit 28 via the interface module 74, according to which the work task is to be executed by the soil cultivation implement 14.

The specification of the site-specific target values or weighting factors is performed here in the scope of work preparation or planning. The site-specific target values or weighting factors are subsequently uploaded into the memory unit 52 associated with the control unit 28 or into the data cloud 46, so that they are retrievable from there when the interface module 74 runs through the control loop.

Carrying out the work preparation or planning is performed on the part of an operator via the operating panel 38 of the user interface 36 or via the central farm management system 44, which in particular has access to an agronomic database, which contains, inter alia, items of information with respect to course, height profile, and dimensions of the field surface 18 to be cultivated, soil properties, prior management history, future management planning including subsequently planned cultivation steps, technical specifications of the soil cultivation implement 14 used, and up-to-date specifications of external influencing factors such as the (prior, current, or predicted to be expected) weather conditions and the like. In the case of cartographically located items of information, they are related by the control unit 28 to position data provided on the part of the GPS receiver 48.

In this case, the process-related or agronomic quality criteria relate to an area performance, process costs, or an agronomic work quality producible by the soil cultivation implement 14. The process costs cover the total occurring financial commitment with regard to carrying out the work task, in particular fuel costs and running operating costs including the investment costs resulting from the service life of the machines used, labor costs, and possible rental costs in each case per unit of area to be cultivated.

The site-specific target values or weighting factors initially specified in the course of the work preparation or planning via the interface module 74 are based in this case on heuristic assumptions with respect to the actual process costs. The heuristic assumptions originate here from the minimum process costs predicted to be expected, while in contrast the target values of the agronomic work quality or the quality criteria representing it are assessed as realistically as possible. The former solely form a starting point for the iterative self-optimization process subsequently executed in the context of the cascaded control loop.

Optimization Module

In a second method step, the target values or weighting factors specified in the interface module 74 are converted into process control variables representing work or operating parameters of the soil cultivation implement 14 in the optimization module 76 by the control unit 28.

In addition, on the level of the optimization module 76, the site-specific target values or weightings originating from the interface module 74 are modified in accordance with feedback data related to the field status or operating status.

The judgment of the status of the field surface 18 represented by the feedback data before or after the cultivation by the soil cultivation implement 14 can take place here using the imaging sensor mechanism 58, 60.

The feedback data provided by the forward-looking sensor mechanism 58 for the case of a harvested grain field relate to status parameters such as the stubble density (i.e., the number of the grain stubbles per unit of area), the height or length of the stubbles or the straw residues, distribution or mass density of an overlaid straw mat, weed infestation, the degree of a soil compaction, and the course of the stubble rows with respect to the cultivation direction. If it is a corn field which has been harvested (by a forage harvester), in particular the status of the stubbles is also significant, namely for the case that they have been split open or flattened by being driven over by the forage harvester during the harvesting process to combat the corn root worm.

In contrast, the feedback data obtained by the rear-looking sensor mechanism 60 relate, for the case of a harvested grain field, to status parameters such as the degree of incorporation of the grain residues or the remaining degree of straw coverage, the crumbling of the field surface 18, the degree of subsoil loosening, or the degree of incorporation of weeds. In the case of a harvested corn field, in addition to the degree of incorporation of the corn stubble or the plant residues in general, status parameters such as the degree of pulverization of the corn stubbles can be included.

Furthermore, a modification of the process control variables as a function of an operating status of the soil cultivation implement 14 or the agricultural tractor 10 is provided. It is derived from items of information of a current fuel consumption of the agricultural tractor 10, a current cultivation speed $\dot{x}_{actual}$ resulting from its driving speed, or a working depth $d_{actual}$ or $d_{Mulcher,actual}$ of the soil cultivation implement 14 or 24 sensorially acquired at the associated lifting mechanism 30 or 32. The relevant items of information are available to the control unit 28 on the CAN bus or ISOBUS 54 of the agricultural tractor 10.

Items of information with respect to a current functional status of the soil cultivation implement 14 are also incorporated into the feedback data. The current functional status can be monitored by using camera-based detector mechanism 56 on the soil cultivation implement 14 or its supporting implement structure 70, wherein these mechanisms recognize on the basis of corresponding image processing or analysis whether harvest residues have collected in the tools of the soil cultivation implement 14 (the tines 20 of the cultivator 16 here) and can result in possible disturbances of the cultivation process. Furthermore, a consideration of the current material flow, i.e., the throughput of harvest residues and field soil per unit of time, is possible in the evaluation of the current functional status. Further details are explained in conjunction with the stabilization module 78 described hereinafter.

Stabilization Module

In a third method step, the previously possibly modified process control variables are adjusted in the stabilization module 78 by the control unit 28 by activating positioning or operating units of the soil cultivation 14 or the agricultural tractor 10. The positioning or operating units are formed in the present case by the two lifting mechanisms 30, 32 and the engine controller 50.

The process control variables derived by the optimization module 76 on the basis of a cost function are, in the case of a soil cultivation implement 14 designed as a cultivator 16, work or operating parameters in the form of the working depth d ($t_q$) and the cultivation speed $\dot{x}(t_q)$. They are adjusted in the stabilization module 78 by a P, PI, or PID controller or a Riccati status controller by activating the positioning or operating units 30, 32, 50 of the soil cultivation implement 14 or the agricultural tractor 10: The cultivation speed $\dot{x}(t_q)$ is adapted here by corresponding interventions in the engine controller 50 of the agricultural tractor 10, while in contrast the working depth d($t_q$) is set by suitably changing the lift position of the rear three-point power lift 12, for which purpose the hydraulic lift mechanism 32 is activated accordingly by the control unit 28.

The material flow corresponding thereto results here from the product of working width b, working depth d($t_q$), and cultivation speed $\dot{x}(t_q)$ as $$\dot{m}(t_q)=d(t_q)\cdot b\cdot \dot{x}(t_q)).$$

Self-Optimization Process

For the purposes of the (self-)optimization of the achievable cultivation efficiency and quality, it is provided that a cost function is calculated and minimized within predetermined limits of the agronomic quality criteria by the control unit 28 for modification of the process control variables.

The cost function is a relationship of the form $$J_{overall} = \lambda_1 \cdot J_{Fuel} + \lambda_2 \cdot J_{Operation} + \sum_{k=0}^{M} l(\epsilon_k(t_q), t_q)_{Work\ quality},$$

wherein the dimension $J_{Fuel}$ reflects the fuel costs and the dimension $J_{Operation}$ reflects the running operating costs. The two dimensions $J_{Fuel}$ and $J_{Operation}$ initially result here from the site-specific target values specified via the interface module 74 with respect to the process costs, wherein they are adapted accordingly in the context of the performed self-optimization. The component $$\sum_{k=0}^{M} l(\epsilon_k(t_q), t_q)_{Work\ quality}$$

corresponds here to an unequal secondary condition for maintaining the site-specific target values for the agronomic work quality or the quality criteria representing it. $\epsilon_k$ represents in this case a status parameter obtained by the forward-looking or rear-looking sensor mechanism 58, 60 and $l(\epsilon_k(t_q),t_q)$ represents a penalty term, which models the costs upon infringement of a respective agronomic secondary condition $\epsilon_{k,min} \leq \epsilon_k \leq \epsilon_{k,max}$ to be maintained. The summation takes place here over its total number M, corresponding to the scope of the feedback data.

In other words, the agronomic quality criteria are incorporated as secondary conditions in the cost function by the control unit 28.

The coefficient $\lambda_1$ or $\lambda_2$ forms a weighting factor to be selected for the fuel costs or operating costs, the value of which is empirically specified and can be varied by the operator within given limits. This applies, inter alia, to the case in which the operator places increased value on a cost-saving or fuel-saving performance of the cultivation process.

The basic concept for the agronomic work quality to be achieved, therefore the quality criteria representing it, is that the operator selects the latter in the context of the work preparation or planning and additionally can assess them by an associated weighting factor $q_k$. The resulting process costs then result as $$l(\epsilon_k(t_q), t_q) = \sum_{q=0}^{N} \sum_{j=0}^{1} q_k\left[(K_{j1} + K_{j2}\cdot \epsilon_k(t_q) + K_{j3}\cdot \epsilon_k(t_q)^2\right],$$

wherein the term associated with the index j=0 forms a lower limit and the term associated with the index j=1 forms an upper limit for a corridor to be maintained with respect to the kth status parameter $\in_k$. Such a corridor can be formed, for example, on the basis of a permissible degree of straw coverage between 0% and 30% or between 30% and 60%. The corridor to be maintained for the status parameter $\in_k$ then results in a U-shaped curve or increase of the process costs toward the limits of the corridor.

The parameters $K_{j1}$, $K_{j2}$, $K_{j3}$ are empirically determined values which represent a deviation of the process costs upon infringement of the predetermined target values for the agronomic work quality. These influence the strictness of the rise of the process costs upon reaching the corridor limits. $t_q$ represents the time which has passed at the discrete point in time q.

The sum $\Sigma_{q=0}^N$ corresponds to the total amount of the process costs for an optimization horizon N, which is typically between a few milliseconds up to 5 seconds. If the time counter $t_q$ is assigned, for example, a time span of 1 second, N=5 would thus apply for an optimization horizon of 5 seconds.

To illustrate the cost function, reference is again to be made in the following to the example of the degree of straw coverage $\in_{residue} \in [0,1]$ behind the soil cultivation implement 14, $$\in_{residue,min} \leq \in (t_q)_{residue} \leq \in_{residue,max}.$$

$\in_{residue} \in [0,1]$ mechanism that the degree of straw coverage is in an interval between 0% and 100%.

The process cost expenditure $l(\in_{residue}(t_q), t_q)$ upon infringement of the secondary condition for $\in_{residue}$ then results as $$l(\in_{residue}(t_q), t_q) =$$
$$\sum_{q=0}^{N} \sum_{j=0}^{1} q_k \left[ (K_{j1} + K_{j2} \cdot \epsilon_k(t_q) + K_{j3} \cdot \epsilon_k(t_q)^2 \right] = \sum_{q=0}^{N} q_{residue}$$
$$\left[ (K_{low,1} + K_{low,2} \cdot \epsilon_{residue}(t_q) + K_{low,3} \cdot \epsilon_{residue}(t_q)^2) + \right.$$
$$\left. (K_{high,1} - K_{high,2} \cdot \epsilon_{residue}(t_q) - K_{high,3} \cdot \epsilon_{residue}(t_q)^2) \right],$$

where secondary condition is only active in the range of $\in_{residue}(t_q) \in [0, \in_{residue,c}]$ or. $\in_{residue}(t_q \in [\in'_{residue,c}, 1]$. Out of the described range, costs out of the secondary condition are equal zero. Further $$K_{low,1} + K_{low,2} \cdot \epsilon_{residue}(t_q) + K_{low,3} \cdot \epsilon_{residue}(t_q)^2 \geq 0 \forall \in_{residue}(t_q) \in [0, \in_{residue,c}],$$

$$K_{high,1} - K_{high,2} \cdot \epsilon_{residue}(t_q) - K_{high,3} \cdot \epsilon_{residue}(t_q)^2 \geq 0 \forall \in_{residue}(t_q) \in [\in'_{residue,c}, 1],$$

wherein $\in_{residue,c}$ or $\in'_{residue,c}$ is in each case a fixed value which is specified by the operator. Depending on the situation and preference of the operator, this corresponds to a degree of straw coverage of 0% or 30% or 30% or 60%, respectively.

For the fuel costs $J_{Fuel}(t_q)$, the following applies $$J_{Fuel}(t_q) = \sum_{q=0}^{N} \left| \dot{f}_{target,tq} - \dot{f}_{actual,tq} \right|^2,$$

wherein the deviation of the actual value $\dot{f}_{actual,t_q}$ from a target value $\dot{f}_{target,t_q}$ of the chronological change of the fuel quantity f specified in the context of the work preparation or planning is calculated and subsequently documented by the control unit 28 to add it to the total fuel costs for the field surface 18 to be cultivated. A relationship of the following form applies here $$f = f(\dot{x}(t_q), M_w(t_q), \ddot{x}(t_q), d(t_q), b, t_q),$$

because the total fuel quantity f consumed at the time $t_q$ or its time derivative $\dot{f}$ may generally be described as a function of the working depth $d(t_q)$, the cultivation speed $\dot{x}(t_q)$, the working width b, a resistance torque $M_w(t_q)$ opposing the driving or the soil cultivation, and a driving acceleration $\ddot{x}(t_q)$ of the agricultural tractor 10.

Correspondingly, the following applies for the running operating costs $J_{Operation}(t_q)$ $$J_{Operation}(t_q) = \sum_{q=0}^{N} |\dot{x}_{target} - \dot{x}_{actual}|^2,$$

wherein here the deviation of the actual value $\dot{x}_{actual}$ from a target value $\dot{x}_{target}$ of the cultivation speed $\dot{x}(t_q)$ specified in the context of the work preparation or planning, in other words the area performance equivalent thereto, is calculated and subsequently documented by the control unit 28 to add it to the total operating costs for the field surface 18 to be cultivated.

To derive the process control variables, a model-predictive approach is selected, which is based on the abovementioned minimization of the cost function within the optimization horizon N. The model-predictive approach supplies a manipulated variable trajectory of the process control variables which is cost optimized with respect to the optimization horizon, wherein it is updated for each following discrete time. The manipulated variable trajectory associated with the current time q then forms the foundation for the activation of the positioning or operating units of the soil cultivation implement 14 or the agricultural tractor 10 in the stabilization module 78. Alternatively, a static optimization method can also be used instead of model predictive approach.

Split-Range Control

Of course, working or operating parameters such as the working depth $d(t_q)$ and the cultivation speed $\dot{x}(t_q)$ have restrictions. In addition, additional restrictions can be intentionally specified by the operator. As a result, this leads to corresponding manipulated variable restrictions when adjusting the process control variables in the stabilization module 78.

If a manipulated variable restriction results in particular due to limiting of the working depth $d(t_q)$ specified by the operator, $$d_{min} \leq d(t_q) \leq d_{max},$$

this is thus additionally taken into consideration in the cost function in the form of a further secondary condition, wherein the secondary condition may be represented, similarly to the formulation of the associated penalty term $l(\in_k(t_q), t_q)$ in the form $l(d(t_q))$. Alternatively, a further cost component $J_{delta\ d(t_q)}$ is also added in the cost function, $$J_{delta\ d(t_q)} = \sum_{q=0}^{N} |d_{target} - d(t_q)|^2,$$

wherein $d_{target}$ represents a target value specified for the working depth $d(t_q)$ in the context of the work preparation or planning.

For the case in which an adjustment of the process control variables is not possible due to manipulated variable restrictions, the control range of the control unit 28 is expanded by switching on the mulcher 26.

Figure 3:
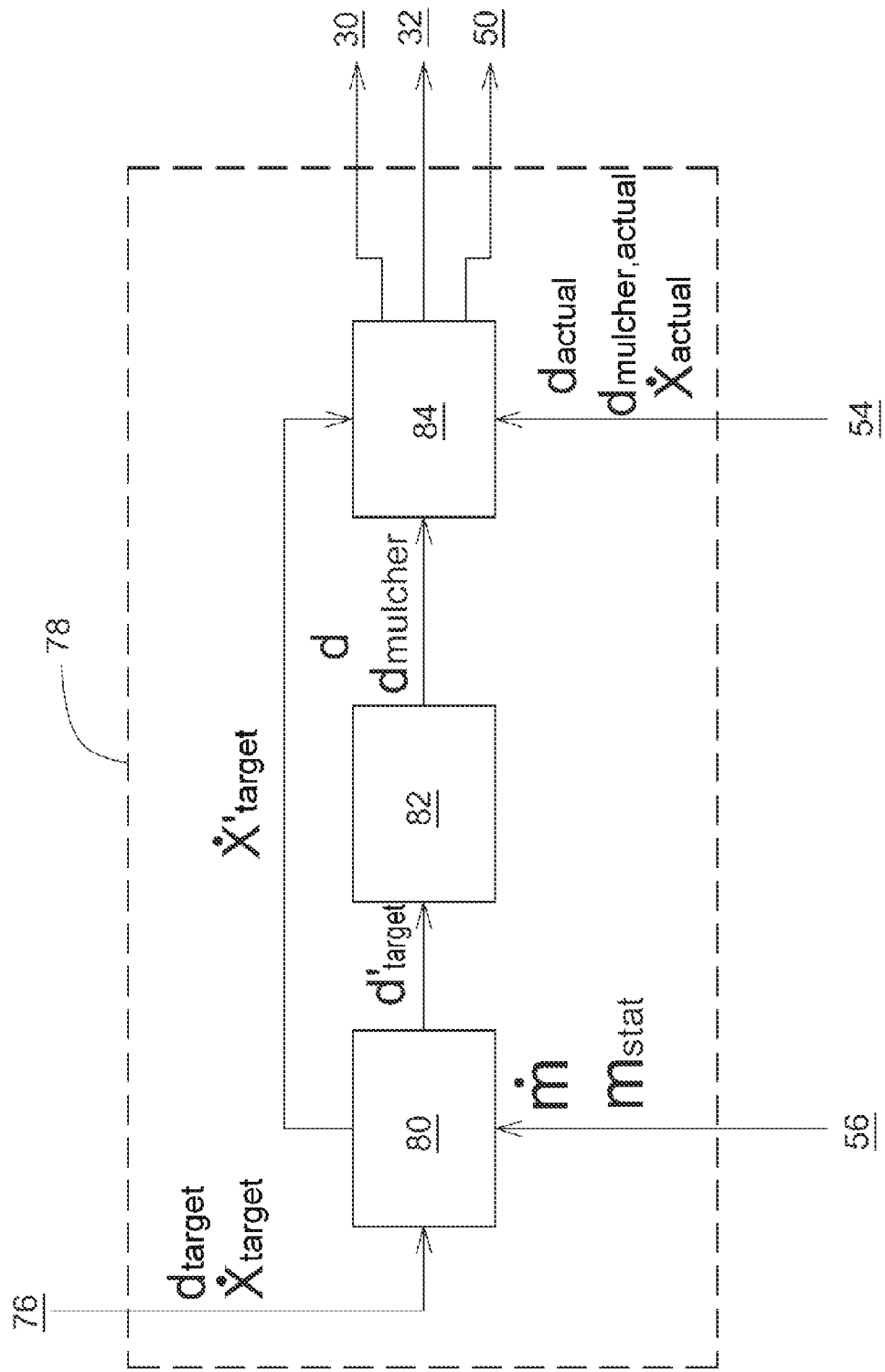
FIG. 3 shows a detail view of a subordinate control loop.

During the operation of the cultivator 16, a manipulated variable restriction predominantly results due to its limited usable working depth $d(t_q)$. If a manipulated variable saturation thus occurs, an artificial expansion of the manipulated variable range can be achieved by a split range control (see module "split-range control" 82 in FIG. 3). If the cultivator 16 reaches its maximum possible working depth $d(t_q)=d_{max}$, the mulcher 26 is thus switched on, wherein its working depth $d_{Mulcher}$ is adjusted by the control unit 28 by activating the frontal three-point force lift 22 in such a way that the effect of the manipulated variable restriction caused by the cultivator 16 is compensated for.

Operational Monitoring

In addition, there is the possibility that the soil cultivation implement 14, more precisely the cultivator 16, is monitored by the control unit 28 with respect to an interruption of a material flow $\dot{m}$ resulting from the adjustment of the process control variables. In the normal case, the desired material flow $\dot{m}$ is ensured by corresponding adjustment of the process control variables. However, there are also situations in which the cultivator 16 clogs, for example due to excess straw accumulations in its tines 20. Such clogs are predicted by the control unit 28 by monitoring of the material flow $\dot{m}$ by the camera-based detector mechanism 56.

An imminent or already occurring interruption of the material flow $\dot{m}$ thus recognized is counteracted on the part of the control unit 28 by activating positioning or operating units 30, 32, 50 of the soil cultivation implement 14 or the agricultural tractor 10. The simplest procedure is to intentionally raise and extend the soil cultivation implement 14 by activating the rear three-point force lift 12 or the associated hydraulic lift mechanism 32 until the clog detaches by itself. This can be performed predictively as soon as the control unit 28 recognizes on the basis of the items of information provided by the camera-based detector mechanism 56 that a threshold value to be maintained for clog-free operation is exceeded. In addition, a mulcher 26 attached in the front region of the agricultural tractor 10 can be included to improve the material flow $\dot{m}$ on the cultivator 16 by pulverizing the grain residues.

The monitoring of the material flow $\dot{m}$ is included as a subordinate control loop (see module "anti-plug control" 80 in FIG. 3) in the stabilization module 78 provided for adjusting the process control variables. The material flow $\dot{m}$ ($\dot{m}=b \cdot d(t_q) \cdot \dot{x}(t_q)$) thus sinks due to resistance with growing material accumulation $m_{stat}$ in the soil cultivation implement 14. The process control variable to be changed is in the case of a cultivator 16 also the working depth $d(t_q)$ here. The control unit 28 reduces the process control variable $d(t_q)$ with increasing extent of the material accumulation $m_{stat}$ to counteract clogging. At the same time, it attempts to maintain the desired material flow m by increasing the working depth $d(t_q)$. Corresponding specification variables $d_{\dot{m}}$ and $d_{mstat}$ result therefrom for the control of the material flow $\dot{m}$. The present control processes resulting therefrom are harmonized by the control unit 28 in that the lesser of the two specification variables $min[d_{\dot{m}}, d_{mstat}]$ is always used for adjusting the process control variable $d(t_q)$. Subsequently, the manipulated variable trajectories refined in the modules "anti-plug control" 80 and "split-range control" 82, which are represented by correspondingly adapted target values $d'_{target}$, $\dot{x}'_{target}$, are adjusted by activating the positioning or operating units 30, 32, 50 of the soil cultivation implement 14 or of the agricultural tractor 10 on the basis of the actual values $\dot{x}_{actual}$, $d_{actual}$, and $d_{Mulcher,actual}$ (see module "status controller" 84 in FIG. 3).

So as not to further negatively affect the cultivation process, the travel of the agricultural tractor 10 is optionally stopped by the control unit 28 until the clog-related interruption is remedied. For this purpose, the agricultural tractor 10 can be brought to a standstill ($\dot{x}(t_q)=0$) from a specific threshold value for $m_{stat}$.

Display & Documentation

In addition, a site-specific statement of costs is calculated by the control unit 28 on the basis of the calculated cost function and visualized via the user interface 36 or its display unit 40. More specifically, the actually occurring fuel costs and the achieved area performance including possible deviations from the assumptions made in the work preparation or planning can be displayed to the user upon completion of the cultivation process. The display of the deviations can be performed in a site-specific manner for the purpose of improved process analysis.

The processing results provided in this way are also transmitted by the control unit 28 to a central farm management system 44 via the data interface 42 to enable comprehensible documentation of the field status at any time.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for automating an agricultural work task which is executable by a soil cultivation implement on an agricultural tractor, comprising:

specifying one or more site-specific target values or weighting factors with respect to process-related or agronomic quality criteria via an interface module according to which the work task is to be executed by the soil cultivation implement, wherein the site-specific target values or weighting factors are specified in the context of work preparation or planning based on an accessible agronomic database including course, height profile, and dimensions of a field surface to be cultivated, and wherein the site-specific target values or weighting factors are uploaded into a memory unit to be retrievable therefrom, wherein the memory unit is associated with a control unit;

converting the target values or weighting factors in an optimization module into process control variables representing working or operating parameters of the soil cultivation implement; and adjusting the process control variables in a stabilization module by activating positioning or operating units of the soil cultivation implement or the agricultural tractor, wherein the stabilization module includes adjusting the process control variables with variable restrictions including a working depth and a cultivation speed;

wherein in the converting step, feedback data is included with respect to a status of a field surface before or after the cultivation by the soil cultivation implement and with respect to an operating status of the soil cultivation implement or the agricultural tractor in order to modify the process control variables based on a cost function and on the site-specific target values or weighting factors to provide modified process control variables, wherein the feedback data includes a course of stubble rows, a height of stubbles, and a degree of soil compaction which is obtained by a sensor mechanism attached to one of the soil cultivation implement or the agricultural tractor.

2. The method of claim 1, wherein the site-specific target values or weighting factors are performed on the part of an operator via a user interface provided in the agricultural tractor or via a central farm management system.

3. The method of claim 1, wherein the process-related or agronomic quality criteria relate to an area performance, process cost, or an agronomic work quality producible by the soil cultivation implement.

4. The method of claim 1, further comprising modifying the site-specific target values or weightings originating from the interface module according to the feedback data.

5. The method of claim 1, further comprising including items of information with respect to a current functional status of the soil cultivation implement in the feedback data.

6. The method of claim 1, further comprising calculating the cost function by the control unit.

7. The method of claim 6, further comprising minimizing the cost function within predetermined limits of the agronomic quality criteria by the control unit for the modification of the process control variables, wherein the cost function is based on fuel costs and running operating costs.

8. The method of claim 7, further comprising incorporating the agronomic quality criteria by the control unit as secondary conditions in the cost function.

9. The method of claim 1, wherein, when an adjustment of the process control variables is not possible due to the variable restrictions, the control range is functionally expanded by the control unit by switching on an additional soil cultivation implement.

10. The method of claim 1, further comprising monitoring the soil cultivation implement by the control unit with respect to an interruption of a material flow resulting from the adjustment of the process control variables.

11. The method of claim 10, further comprising counteracting a recognized imminent or already occurring interruption of the material flow on the part of the control unit by activating positioning or operating units of the soil cultivation implement or the agricultural tractor.

12. The method of claim 11, further comprising stopping the travel of the agricultural tractor by the control unit until the material flow interruption is remedied.

13. The method of claim 1, further comprising calculating a site-specific statement of costs by the control unit on the basis of a calculated cost function.

14. The method of claim 13, further comprising displaying the site-specific statement of costs via a user interface.

* * * * *